United States Patent [19]

Eerenstein et al.

[11] Patent Number: 5,097,151
[45] Date of Patent: Mar. 17, 1992

[54] SEQUENTIAL FINITE-STATE MACHINE CIRCUIT AND INTEGRATED CIRCUIT

[75] Inventors: Lars A. R. Eerenstein; Mathias N. M. Muris, both of Eindhoven, Netherlands

[73] Assignee: U.S. Philips Corporation, New York, N.Y.

[21] Appl. No.: 657,005

[22] Filed: Feb. 13, 1991

[30] Foreign Application Priority Data

Feb. 16, 1990 [NL] Netherlands ............... 9000380

[51] Int. Cl.⁵ ............................................. H03K 19/177
[52] U.S. Cl. ............................... 307/465; 307/480; 364/716
[58] Field of Search ............. 307/443, 465, 468–469, 307/480; 364/216, 900 MS File

[56] References Cited

U.S. PATENT DOCUMENTS

| | | | |
|---|---|---|---|
| 4,488,229 | 12/1984 | Harrison | 364/716 X |
| 4,649,498 | 3/1987 | Kedem et al. | 364/518 |
| 4,663,545 | 5/1987 | Pumo et al. | 307/468 X |
| 4,675,556 | 7/1987 | Bazes | 307/465 |
| 4,755,967 | 7/1988 | Gebris et al. | 364/900 MS |

Primary Examiner—David Hudspeth
Attorney, Agent, or Firm—Steven R. Biren

[57] ABSTRACT

Additional logic is added to a sequential finite-state machine circuit having a self-initialing behavior so that the circuit can be simulated. From any state, a rest state is reached by way of a given sequence of values of an input signal. Transitions between states of the finite-state machine are realized by the additional logic, such that the simulated circuit realizes the transition from an unknown state to a known, absorbing state in steps.

6 Claims, 4 Drawing Sheets

| | | | | |
|---|---|---|---|---|
| 1 | 1 | 1 | 1 | 1 |
| 2 | 1 | 1 | 0 | 0 |
| 3 | 1 | 1 | 0 | 1 |
| 4 | 1 | 1 | 1 | 0 |
| 5 | 0 | 0 | 1 | 1 |
| 6 | 0 | 0 | 1 | 0 |
| 7 | 0 | 0 | 0 | 1 |
| 8 | 0 | 0 | 0 | 0 |
| 9 | 0 | 1 | 1 | 1 |
| 10 | 0 | 1 | 1 | 0 |
| 11 | 0 | 1 | 0 | 1 |
| 12 | 0 | 1 | 0 | 0 |
| 13 | 1 | 0 | 0 | 0 |
| 14 | 1 | 0 | 0 | 1 |
| 15 | 1 | 0 | 1 | 1 |
| 16 | 1 | 0 | 1 | 0 |

SEQUENTIAL FINITE-STATE MACHINE CIRCUIT AND INTEGRATED CIRCUIT

BACKGROUND OF THE INVENTION

The invention relates to a sequential finite-state machine circuit, comprising a set of N bistable elements {FF(1), ..., FF(N)} and a set of combinatory logic connected thereto, the combination of logic values of the bistable elements defining a state of the circuit which is a representation of a state of a finite-state machine, the circuit changing over to a next state at instants which are determined by a clock signal under the influence of the combinatory logic, the current state of the circuit and an input signal, the set of combinatory logic realising transitions between states of the finite-state machine in the circuit.

A circuit of this kind is known from German Offenlegungsschrift DE-3719181-A1.

The invention also relates to an integrated circuit comprising such a circuit.

A finite-state machine (FSM) is a frequently used model for the representation of logic systems. Contrary to continuous or analog machines, the operation of the FSM is based on discrete value information. FSMs can be subdivided into combinatory machines (without a memory: the input signals unambiguously define the output signals), and sequential machines (comprising a memory: the current contents thereof and the input signals unambiguously define the new contents of the memory and the output signals).

An FSM can be implemented in an FSM circuit: combinatory logic with flipflops which are retrocoupled to the logic, with input or control signals and a clock signal (synchronous FSM), the logic realising transitions between states of the FSM (represented by the contents of the flipflops) in the circuit.

An FSM may have a state which is referred to as being absorbing: this so-called rest state is reached from all feasible states, provided that the input or control signal has assumed a given series of values. The FSM is thus self-initiating: the supply of the given sequence of values of the input signal ensures that the FSM will subsequently be in the absorbing state.

When a model of such an FSM is simulated by means of a logic digital simulator, this self-initiating behavior of the circuit does not become apparent: the simulator starts with an unknown state at the beginning of the simulation and is event driven (i.e. it progresses from one state to another state), so that only the current state of the simulator is known. Due to this lack of history in the simulator, initializations via a sequence of supplied values cannot be simulated. This problem could be solved by forcing the FSM to a known state at the beginning of a simulation. However, that is not a representation of reality which should be approximated as well as possible during the simulation. Moreover, this intervention in the circuit imposes practical problems because of the difficulty in accessing internal points of the circuit.

SUMMARY OF THE INVENTION

It is inter alia an object of the invention to provide a sequential finite-state machine circuit having a self-initiating behavior that can be simulated. To achieve this, a sequential finite-state machine circuit in accordance with the invention is characterized in that from any state a rest state is reached by way of a given sequence of X values of the input signal, $\{c(0), c(1), \ldots, c(X-1)\}$, starting with $c(0)$, every sub-sequence $\{c(0), c(1), \ldots, c(J-1)\}$, having the length J, occurring in the given sequence of X values of the input signal, where $1 <= J <= X$, or a sub-sequence having the length J which is a one-to-one representation thereof, being stored in the circuit. The simulator is thus enabled to realize the transition from an unknown state to the known, absorbing state in steps.

One embodiment of a sequential finite-state machine circuit in accordance with the invention is characterized in that the N bistable elements are presettable, the circuit being provided with $(X-1)$ further bistable elements, coupled as a shift register, for the storage of the $(X-1)$ most recent values of the input signal or values which are a one-to-one representation thereof, and is also provided with decoding logic, fed by the input signal and the $(X-1)$ bistable elements of the shift register, which logic forms a detection signal as regards the occurrence of the given sequence of X values of the input signal, said detection signal being applied as a preset signal to the N presettable bistable elements. A detection signal as regards the occurrence of the given sequence is supplied by the decoding logic which evaluates the shift register and the input signal.

A further embodiment of a sequential finite-state machine circuit, where $X >= N$, in accordance with the invention, is characterized in that the circuit comprises $(X-N)$ further bistable elements $FF(N+1), \ldots, FF(X)$, and additional combinatory logic which, in response to the occurrence of the sub-sequence $\{c(0), c(1), \ldots, c(J-1)\}$, having the length J, of the given sequence of X values of the input signal, where $1 <= J <= X$, each time makes the first J bistable elements $FF(1), \ldots, FF(J)$ assume a representation sequence of J values which is a one-to-one representation said sub-sequence, the assignment of representations to states of the finite state-machine being such that the states are represented by combinations of logic values of the bistable elements which correspond, as regards the first J values, to the representation sequences of J values. For this type of FSM circuit, where the length of the given sequence of the input signal is greater than the number of bistable elements (for example, set/reset flipflops), an advantage is achieved in that a minimum number of additional bistable elements is required and that the bistable elements used need not be presettable. As a result of the storage of sub-sequences occurring, the circuit is automatically initialized when the whole sequence occurs.

A preferred embodiment of a sequential finite-state machine circuit, where $X >= N$, in accordance with the invention is characterized in that the circuit comprises $(X-N)$ further bistable elements for the storage of the $(X-N)$ most recent values of the input signal, or values which are a one-to-one representation thereof, the circuit also comprising additional logic which, in response to the occurrence of a sub-sequence $\{c(0), c(1), \ldots, c(J-1)\}$, having the length J, of the given sequence of X values of the input signal, where $X-N < J <= X$, each time makes the first $J-X+N$ bistable elements $FF(1), \ldots, FF(J-X+N)$ assume a representation sequence of $J-X+N$ values which is a one-to-one representation of said sub-sequence, the assignment of representations to states of the finite-state machine being such that the states are represented by combinations of logic values of the bistable elements which correspond, as regards the first J−X+N values, to the representation sequences of J−X+N values. This FSM has the additional advantage that no unused states can occur in the flipflops of the circuit.

A further embodiment of a sequential finite-state machine circuit in accordance with the invention, where X<N, is characterized in that the circuit comprises additional logic which, in response to the occurrence of a sub-sequence {c(0), c(1), ..., c(J−1)}, having the length J, of the given sequence of X values of the input signal, where 1<=J<=X, each time makes the first J bistable elements FF(1), ..., FF(J) assume a representation sequence of J values which is a one-to-one representation said sub-sequence, the assignment of representations to states of the finite-state machine being such that the states are represented by combinations of logic values of the bistable elements which correspond, as regards the first J values, to the representation sequences of J values, the additional logic making, in response to the occurrence of the whole sequence of X values of the input signal, the bistable elements FF(X+1), ..., FF(N) assume values which correspond to the logic values of the rest state. For this type of circuit, where the length of the given sequence of the input signal is smaller than the number of flipflops, an additional advantage is obtained in that initialization is realized without additional flipflops.

BRIEF DESCRIPTION OF THE DRAWING

The invention will be described in detail hereinafter with reference to the drawing. Therein.

DESCRIPTION OF THE PREFERRED EMBODIMENTS

Figure 1:
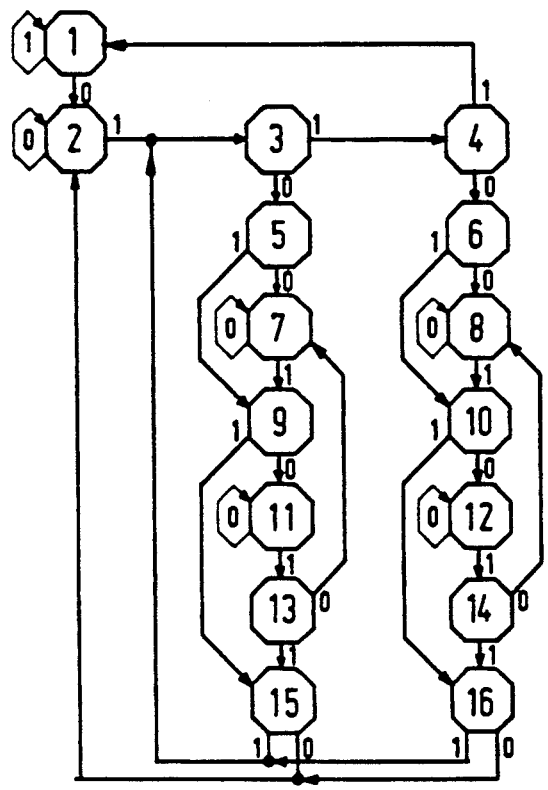
FIG. 1 shows a state transition diagram of a finite-state machine.

The invention will be described in detail hereinafter with reference to the sequential finite-state machine whose state transition diagram is shown in FIG. 1. The FSM has 16 states and various transitions therebetween which are controlled by a clock signal and an input signal. The input signal is in this case a bivalent type ("0" or "1"). Generally speaking, an input signal may also consist of more bits. At instants which are defined by the clock signal, for example at to each position going edge, the finite-state machine changes over to a next state. The state bearing the number 1 is absorbing in the case of a sequence of 5 successive input signals having the value "1": the rest state 1 is reached from any rest state after at the most 5 ones of the input signal. The given sequence of X values of the input signal {c(0), c(1), ..., c(X−1)} in this case appears as follows: {"1", "1", "1", "1", "1"}; X=5 and N=4. It will be apparent that these values have been chosen merely by way of example; other choices are also possible. This sequential finite-state machine can be implemented in a circuit by means of 4 bistable elements or flipflops (2 to the power of 4 implies 16 feasible states), and a set of combinatory logic which realises the correct transitions between the states.

Figure 2:
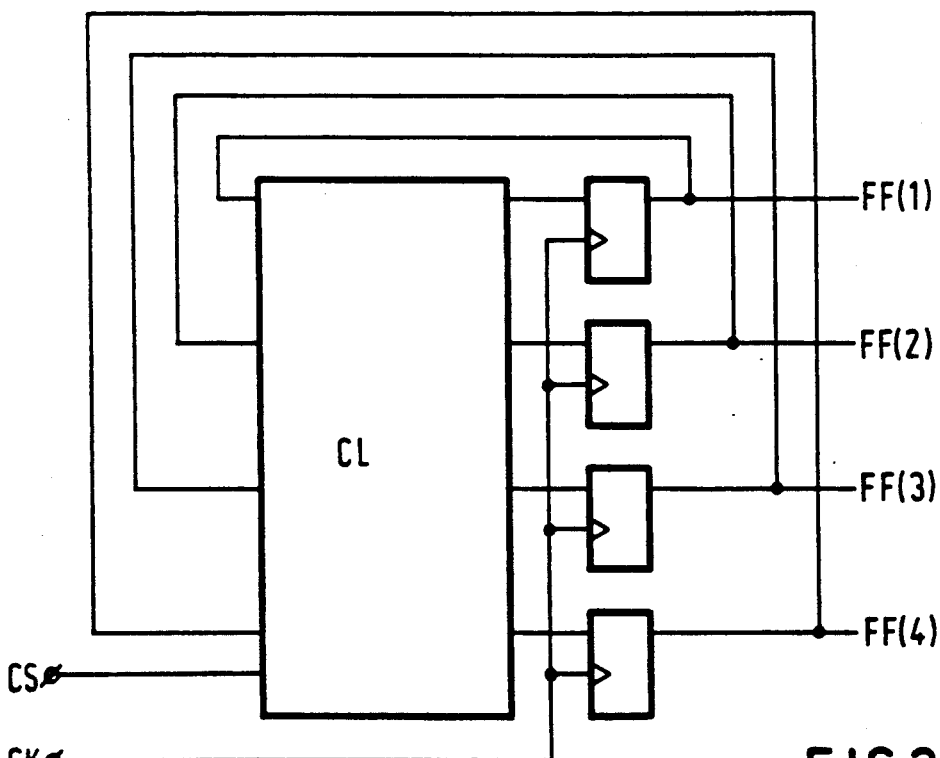
FIG. 2 shows an appropriate circuit.

The exact composition of the set of combinatory logic required for this purpose can automatically be generated and optimized, for example, by means of the software package LOCAM from PRAXIS Systems PLC, 20 Manvers Street Bath BA1 1PX, United Kingdom. The FSM circuit is shown in FIG. 2: 4 flipflops numbered FF(1) to FF(4), are connected and retrocoupled to a set of combinatory logic CL which also receives an input signal CS, the clock signal CK controlling the rate of the state transitions.

The circuit can be simulated by means of a logic digital simulator, for example, the QUICKSIM from Mentor Graphics B.V., Marsstraat 9, 2132 HR Hoofddorp, The Netherlands, as described in the User's Manual, ref. No. 14773, May 1988.

The simulator is fed with data concerning the circuit: flipflops, connections and logic, states and possible transitions. On the basis thereof, the simulator simulates the behavior of the circuit. At the beginning of a simulation (power up), the FSM may be in an arbitrary state; the contents of the flipflops are unknown to the simulator. The simulator cannot "remember" previous control signals: it has insufficient data available so as to abandon the unknown state by calculation. Thus, the state of the FSM remains unknown after a next clock signal. The self-initiating behavior, therefore, cannot be simulated. The reason of this limited simulation capacity consists in that a simulator has three logic states: low ("0"), high ("1"), and unknown ("X"). The number of unknown values "X" can be reduced, for example when a "0" and an "X" are applied to an AND-gate: the result will definitely be a "0". The same result can be achieved by applying a "1" and an "X" to an OR-gate: the result is certainly a "1". A "1" and an "X" applied to an AND-gate, however, produce an "X" again.

It will be evident that the FSM can be set to a known state at the beginning of a simulation by forcing signals onto internal points of the circuit. The physical access to these internal points, however, is often very difficult. Moreover, the user must then know that the FSM must be initialized and also how this should be done.

The problem that the simulator does not exactly simulate the actual behavior of the FSM can be solved better by hardware adaptation: the (temporary) storage of sub-sequences {c(0), ..., c(J−1)}, where 1<=J<=X, or sub-sequences which are a one-to-one representation (for example, the logic complement), occurring supplies the simulator with additional information enabling the simulator to realize the transition from an unknown to a known state in steps. The various possibilities in this respect will be described with reference to the FSM defined above.

Figure 3:
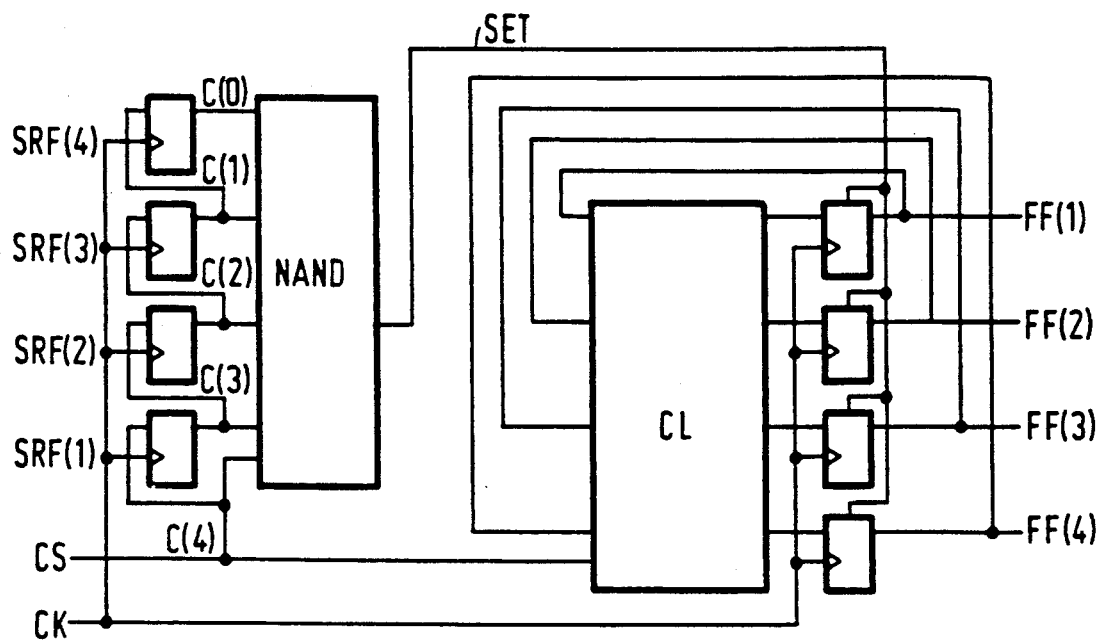
FIG. 3 shows a first embodiment of an FSM circuit in accordance with the invention.

FIG. 3 shows an embodiment of an FSM circuit in accordance with the invention. Four additional flipflops SRF(1), ... SRF(4) are added to the circuit of FIG. 2, which flipflops are coupled so as to form a shift register in which the 4 preceding values of the input signal CS can be stored. The outputs of the additional flipflops SRF(1), ..., SRF(4) and the current input signal on the input CS are applied to a decoder sub-circuit (in this case consisting of a NAND-gate) which forms a detection signal SET as regards the occurrence of the given sequence of input signals (in this case: logic "0" exclusively if all 5 inputs are logic "1"). This detection signal SET is applied as a preset signal to the flipflops FF(1), ..., FF(4) which contain the state of the circuit. These flipflops should be presettable for this purpose. This solution can be used for any choice of X, N and the sequence which leads to absorption.

In practice the value of X will often be greater than or equal to the value of N. For circuits satisfying this condition, an other solution exists. By suitable assignment of binary representations to states of the FSM and by using additional logic, sub-sequences occurring can be "implicitly" stored in the flipflops already present. As appears from FIG. 1, the current state of the FSM can only be one of the states 1, 3, 4, 9, 10, 13, 14, 15 or 16 after the occurrence of a first logic "1". After the occurrence of an input signal in the form of a second logic "1", the state will be 1, 3, 4, 15 or 16. After a third logic "1" input signal, the state is 1, 3 or 4. After a fourth logic "1" input signal, the state is 1 or 4, and after a fifth logic "1" as the input signal, the state is definitely 1. One flipflop FF(5) is added: $X - N = 5 - 4 = 1$. By addition of further logic which ensures that the value of the flipflop FF(J) is logic "1" after an inut signal in the form of at least J logic ones, signal for $1 < = J < = X = 5$, the contents of the flipflops automatically become "11111" after an input signal in the form of five ones. The representation sequence, therefore, is the sub-sequence occurring itself. The assignment of the binary representations to the states of the FSM is then as follows: the states which can be reached directly after an input signal in the form of at least J ones commence with J ones, for example the state 15 becomes "11000". This assignment ensures that the additional logic does not involve inadmissible state transitions: the transitions caused by the additional logic now match exactly with the represented FSM. By successively supplying ones as the input signal, the values "X" are converted into values which are known to the simulator. Any further "1" as the input signal ensures that the simulator knows that the subsequent flipflop no longer has the value "unknown" but the value "1". Therefore, after an input signal in the form of five ones, the flipflops have the values "11111" to the simulator: the self-initialization is a fact. The numbering of the set of bistable elements is, of course, irrelevant. The logic realising the associated transitions can again be automatically generated. The fact that this initialization can be realized without it being necessary to store the input signals for more than 1 clock period can be understood as follows:

FF(1) is "1" after at least one "1" as the input signal;
FF(2) is "1" after at least two logic ones as the input signal;
. . .
FF(5) is "1" after at least five logic ones as the input signal; is equivalent to:
FF(1) is "1" after current input signal 1;
FF(2) is "1" after current input signal 1 and FF(1) is "1";
. . .
FF(5) is "1" after current input signal 1 and FF(1) is "1" and FF(2) is "1" and . . . and FF(4) is "1".

The simulator can thus deduce the initialization from the current values of the flipflops and the input signal and the given state transitions.

Using 5 flipflops instead of the original 4 flipflops, the circuit can thus be simulated. The use of 5 flipflops implies unused states, so that the logic realizing the transitions must also operate for the unused states.

Figure 4:
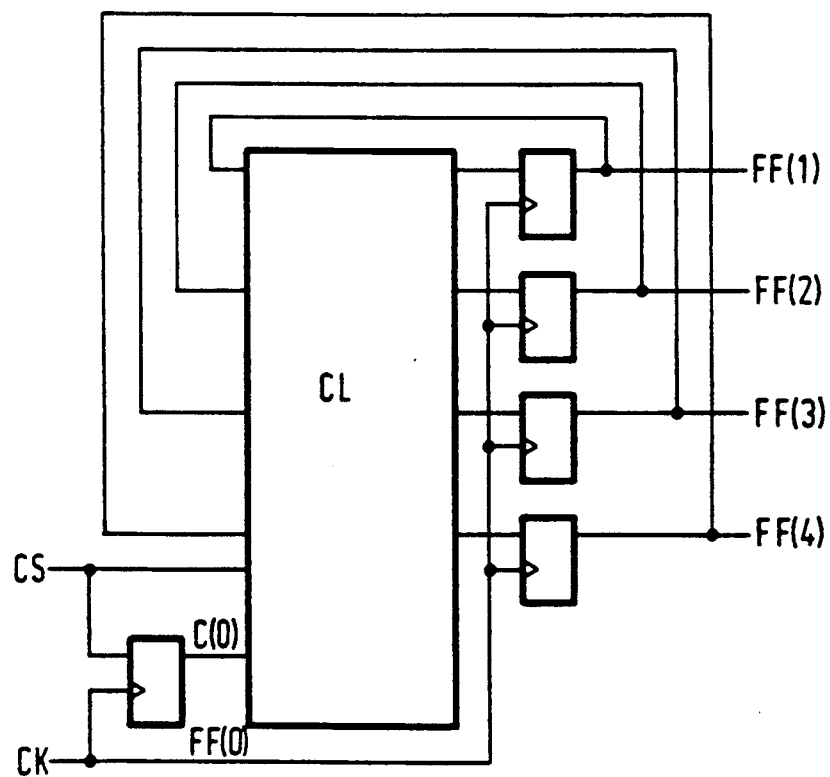
FIG. 4 shows a preferred embodiment of an FSM circuit in accordance with the invention.

A combination of the above two solutions is illustrated in FIG. 4. One additional flipflop FF(0) (because $X - 1 = 1$) is added to the circuit shown in FIG. 2. This additional flipflop is connected to the clock signal CK, to the input signal CS as the input, and to the output c(0) connected to the combinatory logic CL and serves for the storage of the value of the input signal during the preceding clock period. For other choices of X or N, notably if $X > N + 1$, more flipflops are added $(X - N > 1)$; in that case they are used to store the most recent values of the input signal. The additional combinatory logic and the assignment of binary representations to the states of the FSM are such that a sub-sequence occurring (in this case one or more successive logic ones) is stored in the additional flipflop (flipflops) and, if they can no longer contain said sub-sequence, in the original flipflops. Here, the representation sequence thus is the sub-sequence itself again.

Figures 5, 6:
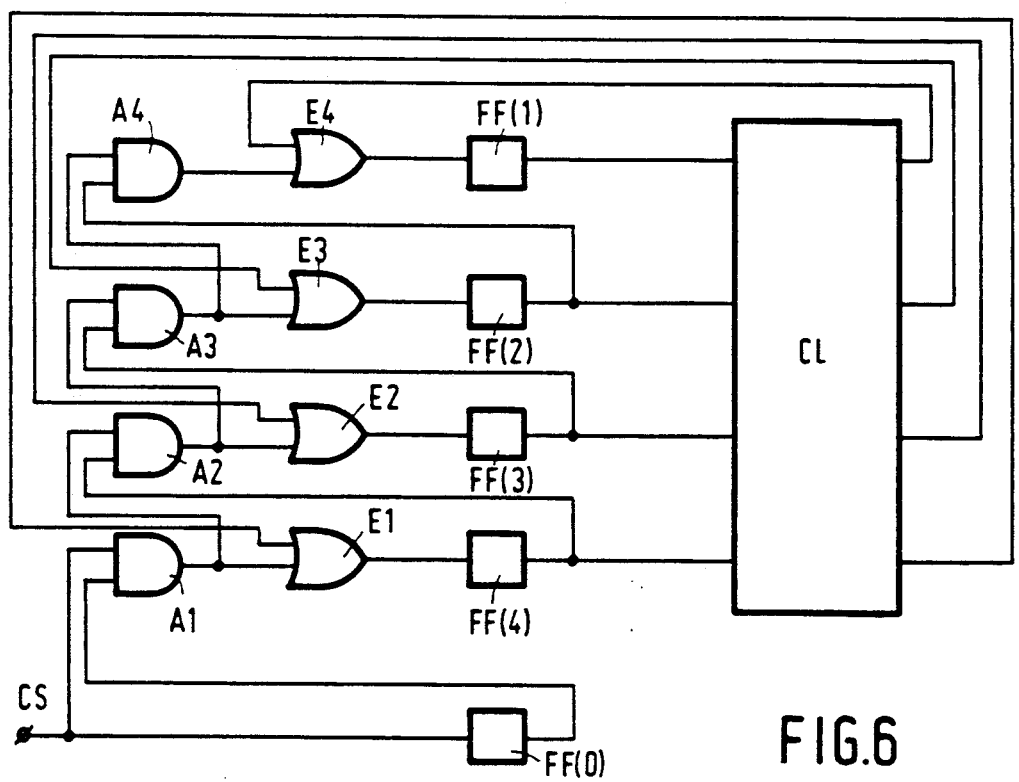
FIG. 5 shows a table illustrating the assignment of representations to states of the finite state machine.
FIG. 6 shows an FSM circuit with a feasible implementation of the additional logic.

FIG. 5 shows a table illustrating a feasible assignment of representations to states of this FSM: the absorbing state 1 is assigned the representation "1111", the state 4 is "1110", the state 3 is "1101" (may also be "1100"), and the states 15 and 16 are "1011" and "1010", respectively (they must in any case commence with a logic 1). No restrictions exist for the other states. This satisfies:

FF(1) is "1" after 2 ones as the input signal;
FF(2) is "1" after 2 ones as the input signal and FF(1) is "1";
FF(3) is "1" after 2 ones as the input signal and FF(1) is "1" and FF(2) is "1";
FF(4) is "1" after 2 ones as the input signal and FF(1) is "1" and FF(2) is "1" and FF(3) is "1".

After 5 ones as the input signal, the contents of the flipflops for the simulator are, therefore, automatically "1111": self initialization.

The logic realizing the associated transitions can be automatically generated and optimized again.

This embodiment offers the following advantages: no presettable flipflops are required, no decoding logic is required, fewer flipflops are required than according to the first solution, and no unused states occur, and hence no additional requirements are imposed as regards the combinatory logic. It is to be noted that for a given sequence in the form of "11111" for the input signal, the requirements imposed as regards the assignment of the representations by the additional logic are not severe: the number of states to be reached after at least J ones may not be greater than two to the power of $(X - J)$. It is also to be noted that in another FSM an alternating sequence which leads to absorption is also possible: for example "101010 . . . ", an EXOR gate then determining when the absorbing state is abandoned.

FIG. 6 shows a feasible implementation of the required additional logic (the connections to the clock signal have been omitted for the sake of simplicity): the input signal CS is applied to FF(0) for the storage of the preceding input signal. The output of FF(0) and CS are applied to an AND-gate A1, the output of which is connected to an OR gate E1 whose input is also connected to an output of the block of combinatory logic CL. The output of the gate E1 is connected to the input of FF(4) whose output is applied, together with the output of A1, to an AND-gate A2. The output thereof is applied to an OR-gate E2 whose input is also connected to CL. The output of the gate E2 is applied to FF(3). This construction is continued fully analogously for the other flipflops. A first "1" as the input signal is stored in FF(0); a second "1" produces a "1" on the output of the gate A1, so in FF(4), regardless of the value of the other input of the gate E1. A third "1" as the input signal also produces a "1" in FF(3), FF(4) and FF(0) also retaining the value "1". A fourth and a fifth "1" also render the last two flipflops "1".

It is to be noted that after the addition of this additional logic, the total amount of logic can be automatically regenerated and optimised again.

Figure 7:
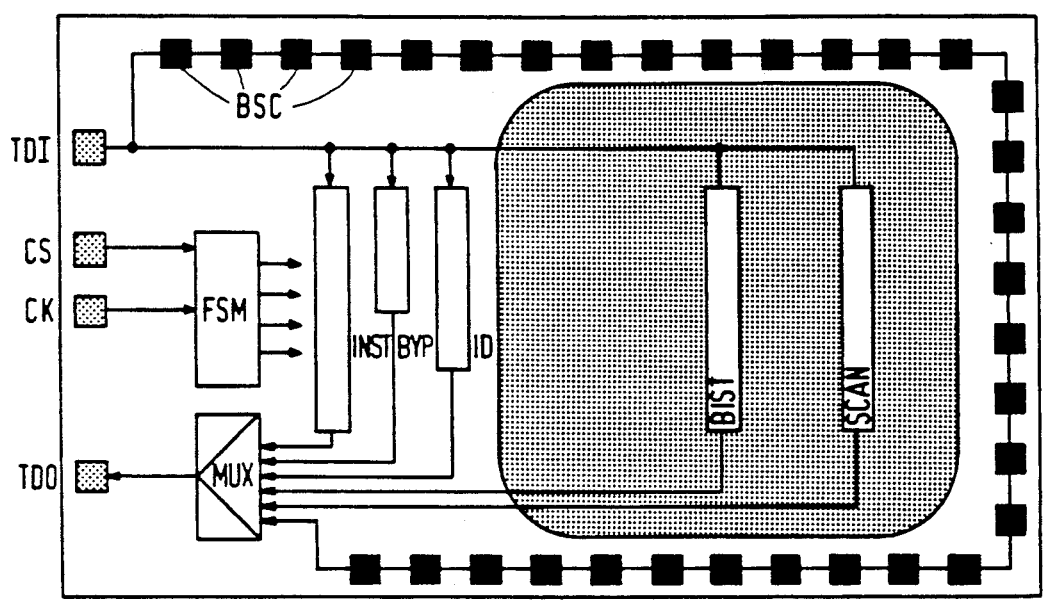
FIG. 7 shows a digital integrated circuit comprising a circuit in accordance with the invention.

FIG. 7 shows a digital integrated circuit comprising a circuit in accordance with the invention. The digital IC comprises connections for the supply of a control or input signal CS, a clock signal CK, a test data input TDI and a test data output TDO. The circuit also comprises a register of bistable elements BIST and a scan register SCAN, connected to combinatory logic (hatched area), and Boundary Scan cells BSC, further registers INST, BYP and ID, a multiplexer MUX, and also a finite state machine circuit FSM in accordance with the invention. For more information as regards the Boundary Scan Test, reference is made to Offenlegungsschrift DE-3727723-A1. The FSM determines state transitions in the registers. The testability of such ICs, constructed in Surface Mounting Technology, is of essential importance.

When a small amount of redundant logic is added and a smart assignment of representation to the states is realized, imposing hardly any restrictions as regards the transition logic, the finite state machine circuit can be fully simulated. In an integrated circuit this can be realized using only little additional chip surface area.

We claim:

1. A sequential finite state machine circuit, comprising a set of N bistable elements {FF(1), ..., FF(N)} and a set of combinatory logic connected thereto, the combination of logic values of the bistable elements defining a state of the circuit which is a representation of a state of a finite state machine, the circuit changing over to a next state at instants which are determined by a clock signal under the influence of the combinatory logic, the current state of the circuit, and an input signal, the set of combinatory logic realizing transitions between states of the finite-state machine in the circuit, characterized in that from any state a rest state is reached by way of a given sequence of X values of the input signal, {c(0), c(1), ..., c(X−1)}, starting with c(0) every subsequence {c(0), c(1), ..., c(J−1)}, having the length J, occurring in the given sequence of X values of the input signal, where $1<=J<=X$, or a sub-sequence having the length J which is a one-to-one representation thereof being stored in the circuit.

2. A sequential finite-state machine circuit as claimed in claim 1, characterized in that the N bistable elements are presettable, the circuit being provided with (X−1) further bistable elements, coupled as a shift register, for the storage of the (X−1) most recent values of the input signal or values which are a one-to-one representation thereof, and is also provided with decoding logic, fed by the input signal and the (X−1) bistable elements of the shift register, which logic forms a detection signal as regards the occurrence of the given sequence of X values of the input signal, said detection signal being applied as a preset signal to the N presettable bistable elements.

3. A sequential finite-state machine circuit as claimed in claim 1, where $X>=N$, characterized in that the circuit comprises (X−N) further bistable elements FF(N+1), ..., FF(X), and additional combinatory logic which, in response to the occurrence of the sub-sequence {c(0), c(1), ..., c(J−1)}, having the length J, of the given sequence of X values of the input signal, where $1<=J<=X$, each time makes the first J bistable elements FF(1), ..., FF(J) assume a representation sequence of J values which is a one-to-one representation of said sub-sequence, the assignment of representations to states of the finite state machine being such that the states are represented by combinations of logic values of the bistable elements which correspond, as regards the first J values, to the representation sequences of J values.

4. A sequential-finite state machine circuit as claimed in claim 1, where $X>=N$, characterized in that the circuit comprises (X−N) further bistable elements for the storage of the (X−N) most recent values of the input signal, or values which are a one-to-one representation thereof, the circuit also comprising additional logic which, in response to the occurrence of a sub-sequence {c(0), c(1), ..., c(J−1)}, having the length J, of the given sequence of X values of the input signal, where $X−N<J<=X$, each time makes the first $J−X+N$ bistable elements FF(1), ..., FF(J−X+N) assume a representation sequence of $J−X+N$ values which is a one-to-one representation of said sub-sequence, the assignment of representations to states of the finite-state machine being such that the states are represented by combinations of logic values of the bistable elements which correspond, as regards the first $J−X+N$ values, to the representation sequences of $J−X+N$ values.

5. A sequential finite state machine circuit as claimed in claim 1, where $X<N$, characterized in that the circuit comprises additional logic which, in response to the occurrence of a sub-sequence {c(0), c(1), ..., c(J−1)}, having the length J, of the given sequence of X values of the input signal, where $1<=J<=X$, each time makes the first J bistable elements FF(1), ..., FF(J) assume a representation sequence of J values which is a one-to-one representation of said sub-sequence, the assignment of representations to states of the finite state machine being such that the states are represented by combinations of logic values of the bistable elements which correspond, as regards the first J values, to the representation sequences of J values, the additional logic making, in response to the occurrence of the whole sequence of X values of the input signal, the bistable elements FF(X+1), ..., FF(N) assume values which correspond to the logic values of the rest state.

6. An integrated circuit comprising a sequential finite-state machine circuit as claimed in claim 1.

* * * * *